United States Patent [19]

Takahashi et al.

[11] Patent Number: 5,439,097
[45] Date of Patent: Aug. 8, 1995

[54] LINK FOR CONVEYOR CHAINS

[75] Inventors: Toshio Takahashi, Toyonaka; Masaaki Ikeda, Daito; Satoshi Kuriyama, Kyoto; Koji Tanaka, Osaka; Shuji Sasamoto, Toyonaka; Katsutoshi Shibayama, Osaka, all of Japan

[73] Assignee: Tsubakimoto Chain Co., Osaka, Japan

[21] Appl. No.: 238,441

[22] Filed: May 5, 1994

Related U.S. Application Data

[63] Continuation of Ser. No. 967,781, Oct. 28, 1992, abandoned.

[30] Foreign Application Priority Data

Oct. 29, 1991 [JP] Japan .................................. 3-96204

[51] Int. Cl.⁶ .............................................. B65G 47/84
[52] U.S. Cl. ............... 198/803.01; 198/690.2; 198/699.1; 198/851
[58] Field of Search ............ 198/690.2, 699.1, 803.01, 198/803.2, 851-853

[56] References Cited

U.S. PATENT DOCUMENTS 3,952,860  4/1976  Specht ......................... 198/803.01
4,611,710  9/1986  Mitsufuji ............................ 198/853

Primary Examiner—Joseph E. Valenza
Attorney, Agent, or Firm—Eugene E. Renz, Jr.

[57] ABSTRACT

A link assembly for a chain comprising a link portion, a top plate portion having a top surface and a bottom surface made of a predetermined first material, and a plate member made of a different material than the top plate portion and integrally molded to at least the one of the top or bottom surfaces of the top plate portion.

11 Claims, 8 Drawing Sheets

LINK FOR CONVEYOR CHAINS

This is a continuation of application(s) Serial No. 07/967,781 filed on Oct. 28, 1992, now abandoned.

FIELD OF THE INVENTION

The present invention relates to improvements in link assemblies for a conveyor chain providing enhanced mechanical properties, such as, wear resistance and a sliding characteristic without reducing the overall strength thereof.

BACKGROUND OF THE INVENTION

Conveyor chains of the type to which the present invention relate, typically comprise a plurality of pivotally interconnected link assemblies, each link assembly comprising a link portion and a so-called top plate portion. As is typical, articles conveyed are supported on the top plate portions. It is known in the prior art to form these link assemblies including the link portion and the top plate portion as an integral molded assembly of polyacetal resin or a resin containing additives such as fluorine and oil. It has been found that these link assemblies have certain disadvantages and drawbacks. For example, link assemblies molded of a polyacetal resin have a high friction factor and thus there is the danger of damage to articles conveyed on the top plate by reason of the sliding motion between the articles. Furthermore, it has been found that the sliding motion produces wear of the polyacetal resin and undesirable formation of powder. Even though link assemblies made of a resin containing fluoride and oil have a low friction factor and good wear resistance, they have the disadvantage of low strength characteristics as compared with link assemblies molded of a polyacetal resin.

It is also known to mount a plate made of a fluorocarbon resin, an ultra-high molecular polyethylene or an elastomer, such as rubber, to the upper surface of the top plate by an adhesive. Even though the plates made of a fluorocarbon resin or an ultra-high molecular polyethylene have a low friction factor, there is the tendency of the resin plate to peel from the top plate portion and thus limit the useful service life of the link assembly. This is also true of plates made of an elastomer such as rubber. Further, the durability thereof is degraded. Moreover, a resin or elastic plate forming a separate element of the top plate portion has a geometric disadvantage in that a stepped portion is formed on the top plate portion by the thickness of the resin or elastic plate hereby tending to catch articles during a conveying cycle.

SUMMARY OF THE INVENTION

With the foregoing in mind, it is an object of the present invention to provide an improved link assembly characterized by novel features of construction and arrangement which eliminates the disadvantages and drawbacks of the prior art discussed above. Accordingly, in accordance with one embodiment of the present invention, there is provided a link assembly comprising a link portion and a top plate portion made of a predetermined first material and including a plate element made of a different material integrally secured to at least one of the upper and lower surfaces of the top plate portion by locking elements in the form rivet-like members formed integrally with the plate element during the molding process. More specifically, the different material made plates, have a connecting piece formed of a flowable substance made to flow in a hole formed in the top plate portion and solidified to connect the plates on both sides of the top plate portion.

In accordance with another embodiment of the present invention, an elastomeric material, such as rubber, is molded on the upper surface of the top plate portion and in accordance with still another form of the invention, the link portion and top plate portion are made of different materials wherein the link portion and the top plate portion are molded integrally.

The material of the top plate element may be selected according to the application of the conveyor chain assembly. Thus, the present invention provides a means for selectively varying the top plate element with a single standard link portion and top plate portion and provides the advantage of an integral molded construction between the top plate portion and the top plate element to eliminate the disadvantages and problems of the prior art discussed above such as undesirable peeling.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
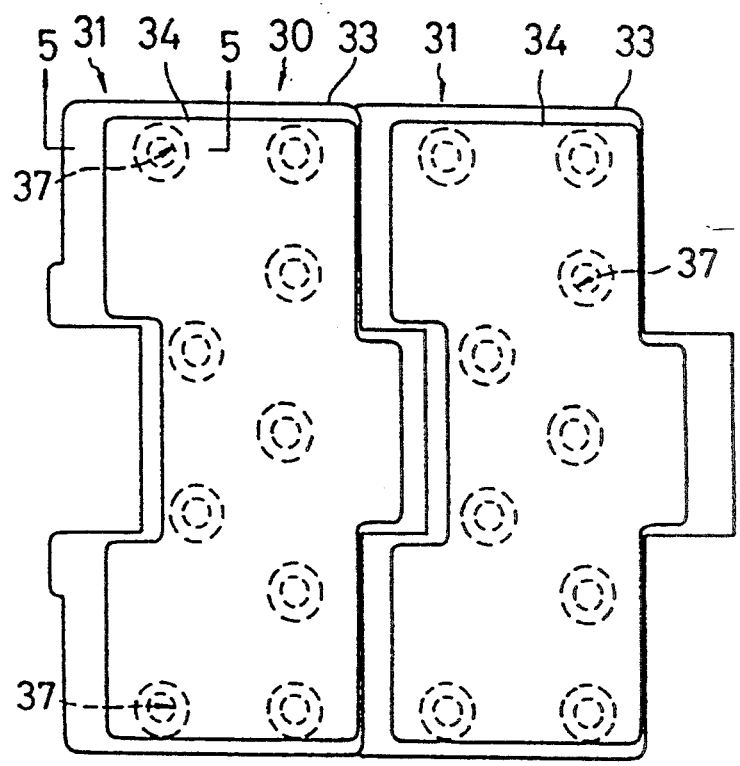
FIG. 1 is a plan view of a link assembly made in accordance with the present invention.
Figure 2:
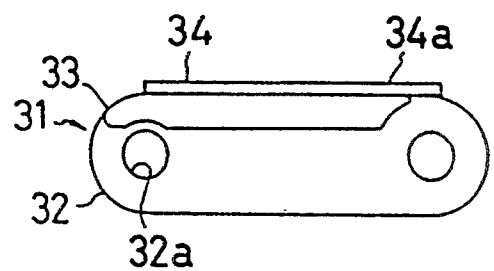
FIG. 2 is a front elevational view of the link assembly shown in FIG. 1.
Figure 3:
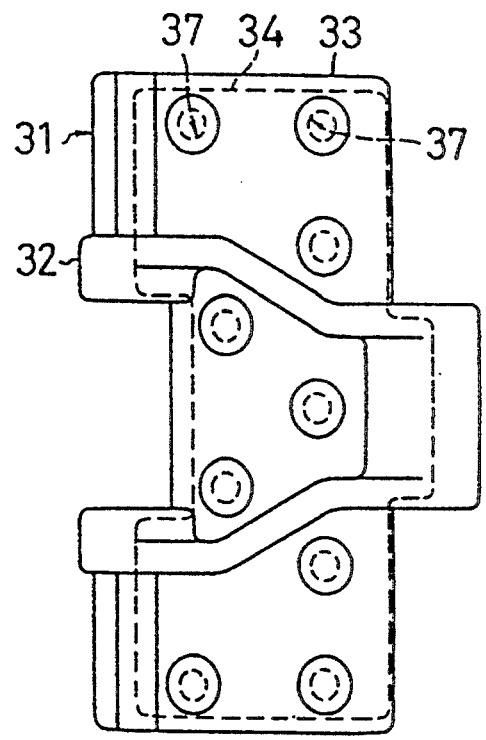
FIG. 3 is a bottom plan view of the embodiment of link assembly shown in FIG. 1.

Referring now to the drawings and particularly to FIGS. 1 and 2 thereof, there is illustrated a link assembly for a conveyor chain made in accordance with the present invention generally designated by the numeral 31. These link assemblies are adapted to be connected to each other by pins in the manner shown in FIG. 1 so that they are freely rotatable and thus form an endless conveyor chain 30.

Each link assembly is comprised of a link portion 32 having transversely extending openings 32$^a$ for pins to pivotally connect the links to one another and a top plate portion 33. The link portion 32 and top plate portion 33 are typically made of materials having high strength, such as certain resins or metals.

In accordance with the present invention, a top plate element or member 34, in the present instance, made of a resin having a low friction factor and high wear resistance, such as an ultra high molecular polyethylene resin is integrally, mechanically connected to the top plate portion 33. In the present instance, the top plate member 34 has a flat planar top surface 34a for supporting products transported by the conveyor chain. The materials of the link portion 32 and top plate portion 33 are different from that of the resin top plate member 34 and as noted above are comprised of resins or, metals having a superior strength to the resin plate member 34. The top plate member 34 is integrally connected to the top plate portion 33 by a plurality of locking elements formed integrally with the top plate member 34 of rivet-like form having a shank 56 engaging through openings 37 in the top plate member 33 and having an enlarged head 44 seated in an enlarged socket 371 formed in the lower face of the top plate portion to lock the top plate member 34 in place on the upper surface of the top plate portion 33.

Figure 4:
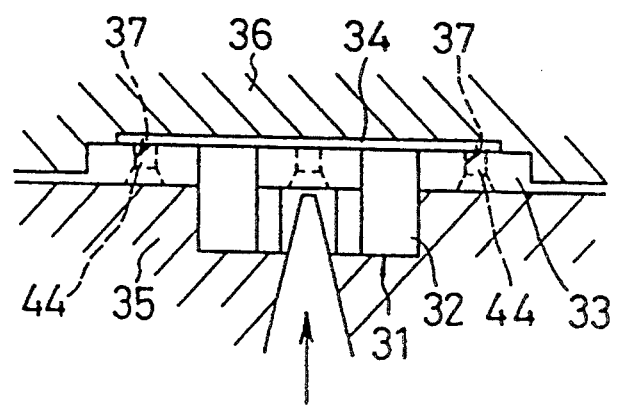
FIG. 4 is a fragmentary sectional view showing the male and female mold members for injection molding the resin plate member in accordance with the present invention.
Figure 5:
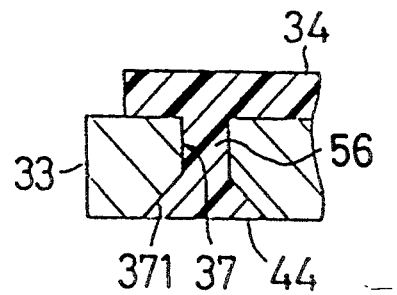
FIG. 5 is an enlarged sectional view taken on lines 5—5 of FIG. 1 showing the means for mechanically locking or securing the plate member to the top plate portion of the link assembly.

The top plate member 34 may be integrally assembled to the top plate portion 33 by injection molding. As schematically illustrated in FIG. 4, the mold consists of a male mold 36 positioned over a female mold 35 to define a cavity therebetween for supporting the link assembly 31. A resin is then injected into the space formed by the confronting inner surface of the male mold 36 and the upper surface of the top plate portion 33. The resin injected hardens to form the top plate 34 and the plurality of locking elements formed during the injection molding process from resin flowing into the spaced array of holes 37 formed in the top plate portion 33. The holes 37 are formed with an outwardly flared counter sink portion 371 as shown in FIG. 5 so that the head 44 of the locking element is outwardly flared to securely hold the top plate member 34 to the upper face of the top plate portion 33.

Figure 6:
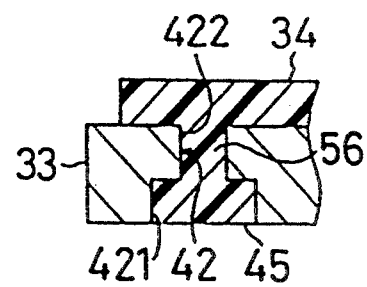
FIG. 6 is a fragmentary sectional view similar to FIG. 5 showing another form of mechanical locking means securing the plate member to the top plate portion of the link assembly.
Figure 7:
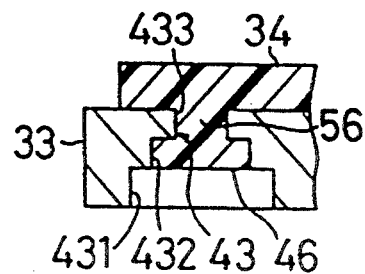
FIG. 7 is a fragmentary sectional view similar to FIGS. 5 and 6 showing still another form of locking means for preventing peel off or removal of the plate member.

Other configurations of locking elements are shown in FIG. 6 and 7. As shown in FIG. 6, the hole in the top plate portion may have a stepped configuration comprising a bore 42 of a predetermined small diameter and an enlarged bore portion 421 of a larger diameter, adjacent the lower face of the top plate portion 33.

FIG. 7 shows a stepped opening comprising the hole 43 extending from the top face of the top plate portion having sections of increasing diameter 431 and 432.

Accordingly, during the injection molding process, resin flowing into the holes 37, 42 and 43 fills into the larger bore portions to form shanks 56 and rivet-like locking elements 44, 45 and 46 locking the plate members 34 in a manner preventing peeling of the resin top plate member 34.

A link assembly 31 made in accordance with the present invention has several disadvantages. For example, there is relatively low frictional resistance between articles placed on the conveyor. The resin top plate member 34' reduces the risk of damage to the article and also reduces the occurrence of wear powder due to a sliding motion which is characteristic of the prior art link assemblies discussed above.

If the chain conveyor is used as a tilting conveyance, the top plate member 34 may be made of an elastomeric material, such as rubber having a high friction factor assembled to the top plate portion 33 in much the same manner as the resin plate member 34, for example, by injection molding. Alternatively, it can be assembled to the top plate by other conventional methods used in the elastomeric technology.

Figure 8:
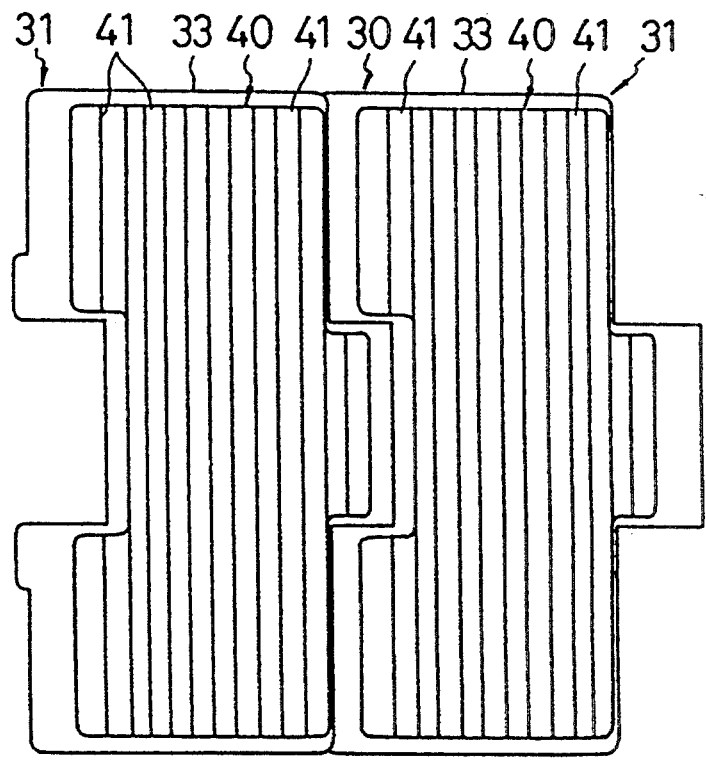
FIG. 8 is a plan view of another embodiment of link assembly in accordance with the present invention.
Figure 9:
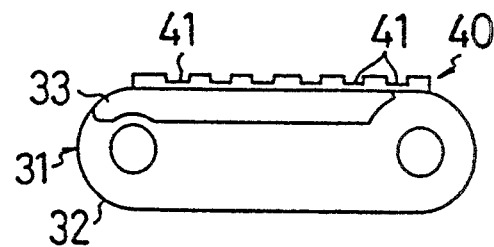
FIG. 9 is a front elevational view of the link assembly shown in FIG. 8.

If desired, as shown in FIGS. 8 and 9, the elastic plate member 40 may be formed with a plurality of grooves 41 formed in its upper surface which extend transversely to the running direction of the conveyor thereby producing an upper surface which is flexible and enlarging the friction factor to articles carried by the conveyor.

Figure 10:
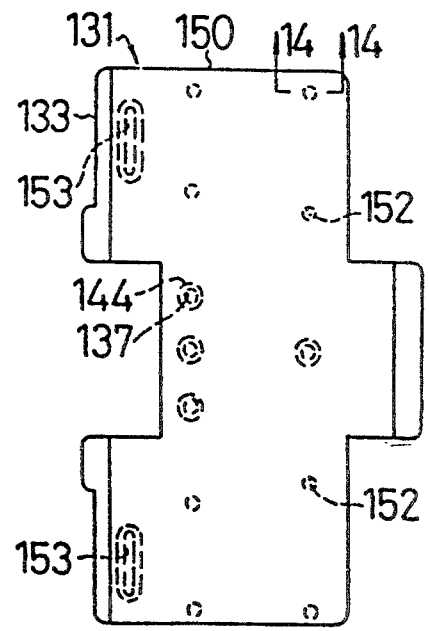
FIG. 10 is a plan view of still another embodiment of link assembly made in accordance with the present invention.
Figure 11:
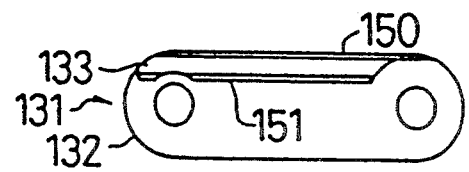
FIG. 11 is a front elevational view of the link assembly shown in FIG. 10.
Figure 13:
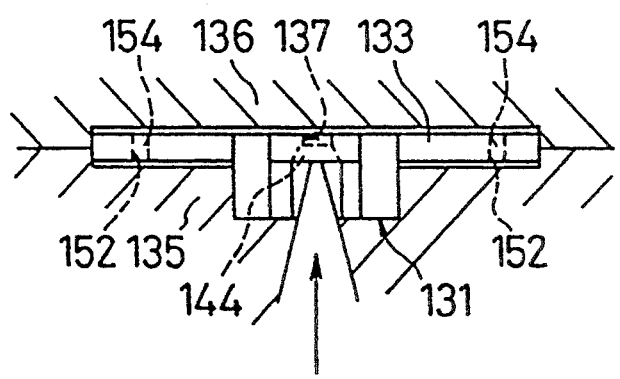
FIG. 13 is a fragmentary sectional view showing the details for injection molding the resin plate member on the link assembly shown in FIG. 10.
Figure 14:
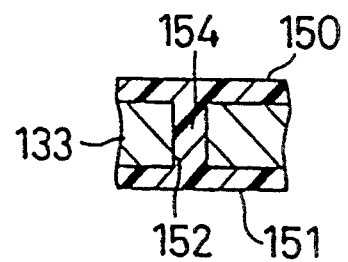
FIG. 14 is an enlarged sectional view taken on lines 14—14 of FIG. 10.

There is shown in FIGS. 10 and 11 another embodiment of link assembly in accordance with the present invention, generally designated by the numeral 131 which are pivotally connected to each other in an endless fashion to form a conveyor chain. This link assembly is likewise comprised of a link portion 132 and a top plate portion 133. Resin plate members 150 and 151 made of a different material then the link assembly, are integrally provided on both sides of the top plate portion 133. The resin plate members 150 and 151 are preferably flat members made of a resin having a low friction factor and excellent wear resistance, for example, an ultra high molecular polyethylene resin. The link portion 132 and top plate portion 133 are preferably made of a material different from the resin plate members 150 and 151 and as noted above may be made of resins or metals having a superior strength characteristic. The plate members 150 and 151 may be integrally formed by placing the link in a cavity formed by overlapping hale and female molds 135 and 136 respectively as shown in FIG. 13 to define a-space between the inner surface of the female mold 136 and the lower surface of the top plate 133. The resin also flows through a plurality of holes 152 and slots 153 to integrally connect the upper and lower resin plates 150 and 151 to the upper and lower surfaces respectively of the top plate portion 133. The resin top plate member and top plate portion essentially form a three-ply sandwich.

Figure 12:
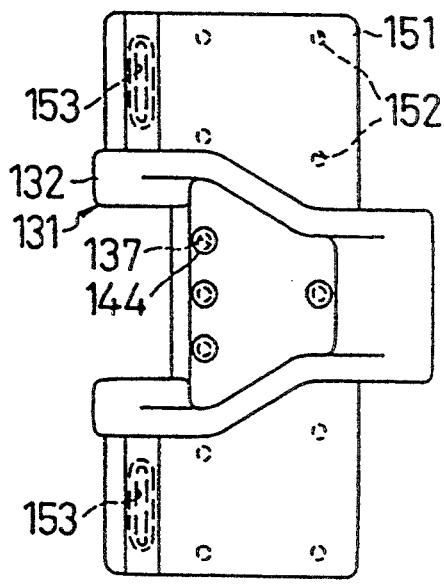
FIG. 12 is a bottom plan view of the link assembly of FIG. 10.

It is noted that since the resin is not injected within the link 132, the lower resin plate 151 is provided outside the link 132 as shown in FIG. 12. Accordingly, part of the upper resin plate member 150 is held firmly in place by rivet-like locking elements engaging in a bore 137 (see FIG. 12) having an outwardly flared head portion similar to the locking elements shown in FIG. 5 preventing peeling of the resin top plate member 150.

Accordingly, the link assembly 131 has a small frictional resistance between articles and the resin plate member 150 therefore provides the advantage that in accumulating articles, it prevents the articles from being damaged and reduces occurrence of wear powder due to sliding motion. Additionally, the link assembly 131 has the advantage of sliding smoothly on conventional guide rails (not shown) supporting the top plate portion from the lower side and of reducing formation of wear powder between the guide rails by the lower resin plate member 151 which confronts and engages of the guide rails. Also as shown in FIG. 10, since the resin top plate member 150 covers the whole surface of the top plate portion 133, it is possible to eliminate the stepped portion due to the thickness of the resin plate 150 on the top plate 133 and thereby convey articles without any obstruction which may present a catch point.

Furthermore, if desired, there may be provided for the top plate portion 133 only the lower resin plate member 151 for the purpose of smooth sliding of the links on the guide rails.

Figure 15:
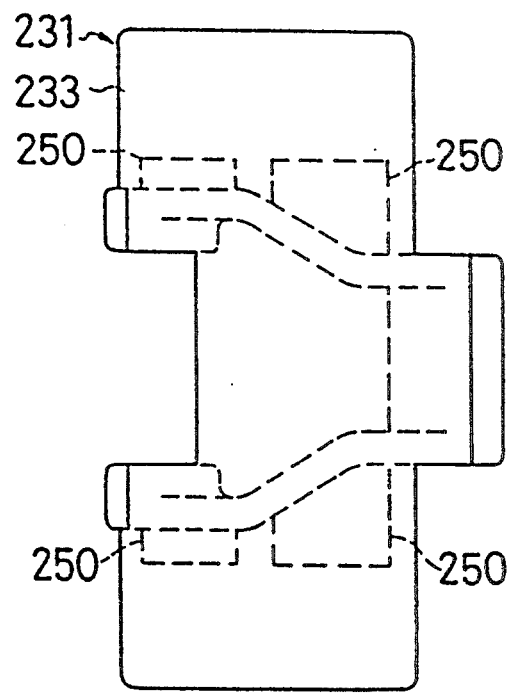
FIG. 15 is a plan view of a still further embodiment of link assembly in accordance with the present invention.
Figure 16:
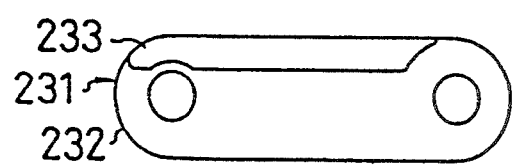
FIG. 16 is a front elevational view of the link assembly of FIG. 15.
Figure 17:
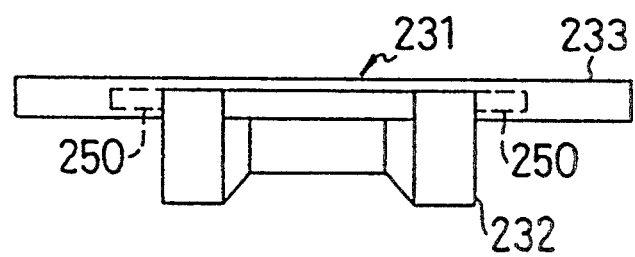
FIG. 17 is a left side elevational view of the link assembly shown in FIG. 15.

There is shown in FIGS. 15-17 another embodiment of link assembly in accordance with the present invention. The link assembly 231 is composed of a link 232 and a top plate member 233 which are different in material from each other. The top plate member 233 is integrally provided on a pair of tongue pieces 250 and 251 projecting from both sides of the link 232 by injection molding.

The top plate member 233 is made of a material having a low friction factor and an excellent wear resistance, for example, an ultra high molecular polyethylene resin. The link 232 and the tongue pieces 250 and 251 are different in material from the top plate member 233, and specifically, are made of resins or metals superior in strength to the top plate member 233.

Accordingly, just as in the above mentioned link assemblies 131, this link assembly 231 has a small frictional resistance between the article and the top plate member 233, and therefore, has an advantage that, in accumulating the article, it prevents the article from being damaged and reduces occurrence of the wear powder due to the sliding motion.

Further, the link assemblies 231 are able to slide on guide rails (not shown) supporting the top plate 233 from the lower side and to reduce the wear powder generated between the guide rails and the same.

Also, since the top plate member 233 itself is made of resin, it is possible to eliminate the stepped portion due to the thickness of the resin plate. This is different from the conventional link element having the resin plate adhered to on the upper surface of the top plate by an adhesive.

Figure 18:
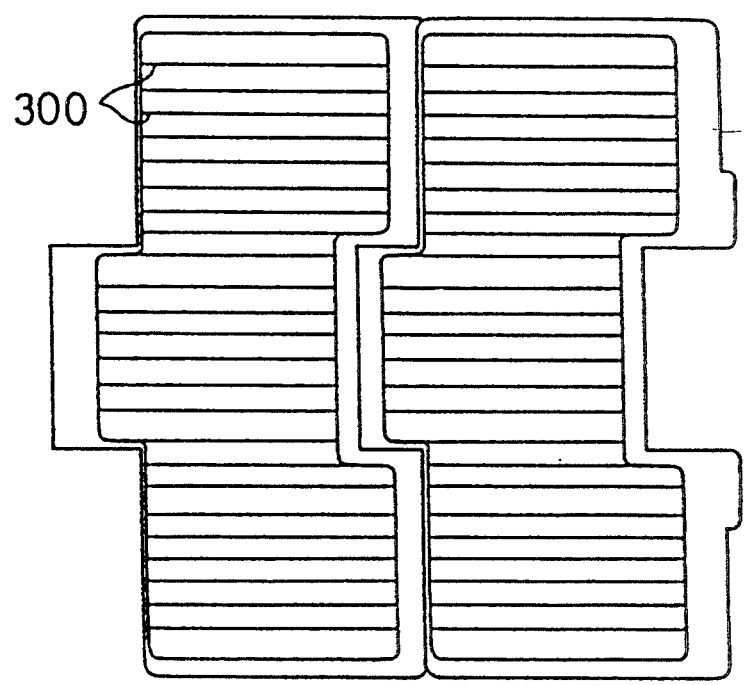
FIG. 18 is a plan view of still a further embodiment of link assembly in accordance with the present invention.
Figure 19:
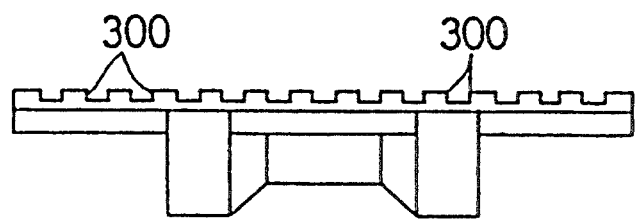
FIG. 19 is a left side elevational view of the link assembly shown in FIG. 18.

In addition, by providing a plurality of grooves 300 on the upper surfaces of the resin plate members 34, 150 and the top plate member 233 of the link elements 31, 131 and 231 parallel to the running direction of the top chain, as shown in FIGS. 18 and 19, it is possible to reduce the contact area with the article and hence to power the frictional resistance in accumulation thereof.

Grooves 300 may be provided on the top face of the plate member which extend in the running direction of the link. Also, in the caste of link assemblies 131 and 231, grooves (not shown) may be provided on the lower surface of the resin plate member 151 or the top plate member 233, just as shown in FIGS. 18 and 19. In this case, the sliding resistance to the guide rails (not shown) can be reduced.

Even though particular embodiments of the invention have been illustrated and described herein, it is not intended to limit the invention and changes and modifications may be made therein within the scope of the following claims.

What is claimed is:

1. A link assembly for a chain comprising a link portion, a top plate portion having a top surface and a bottom surface made of a predetermined first material, and a plate member made of a different material than said top plate portion and integrally molded to at least the one of the top or bottom surfaces of said top plate portion by a plurality of rivet like locking elements formed integrally with said plate member engaging in openings having an enlarged portion formed in said top plate portion.

2. A link assembly as claimed in claim 1 wherein said plate member and locking elements are integrally secured to the link assembly by injection molding.

3. A link assembly as claimed in claim 1 wherein said different material made plates have a connecting piece formed of a substance which is made to flow in a hole formed in said top plate portion and solidified to connect said different material made plates on both sides of said top plate portion.

4. A link assembly as claimed in claim 1 wherein said link portion and top plate portion are metal and said plate member is an ultra-high molecular polyethylene resin.

5. A link assembly as claimed in claim 1 wherein said link portion and top plate portion are metal and said plate member is an elastomeric material, such as rubber.

6. A link assembly for a top chain comprising a link portion, a top plate portion and an elastomeric material, such as rubber integrally molded on the upper surface of said top plate portion to form a top plate member by a plurality of rivet like locking elements formed integrally with said plate member engaging in openings having an enlarged portion formed in said top plate portion.

7. A link assembly for a chain comprising a link portion, a top plate portion having a top surface and a bottom surface made of a predetermined first material, and a plate member made of a different material than said top plate portion and integrally molded to at least one of the top or bottom surfaces of said top plate portion, at least one of said different material made plates having a connecting piece formed of a substance which is made to flow in a hole formed in said top plate portion and solidified to connect an additional different material made plate on opposite sides of said top plate portion.

8. A link assembly as claimed in claim 1 wherein the enlarged portion of said openings is tapered.

9. A link assembly as claimed in claim 1 wherein the enlarged portion of said openings is formed by a step.

10. A link assembly as claimed in claim 1 wherein said enlarged portion is formed by a double step.

11. A link assembly for a chain comprising a link portion, a top plate portion having a top surface and a bottom surface made of a predetermined first material and upper and lower plate members made of a different material than said top plate portion integrally molded to cover the top and bottom surfaces of said top plate portion by a plurality of rivet-like locking elements formed integrally with said top and bottom plate members engaging in openings formed in said top plate portion.

* * * * *